(12) United States Patent
Musoll et al.

(10) Patent No.: US 11,093,415 B2
(45) Date of Patent: *Aug. 17, 2021

(54) PACKET PROCESSING SYSTEM, METHOD AND DEVICE UTILIZING A PORT CLIENT CHAIN

(71) Applicant: Marvell Asia Pte, Ltd., Singapore (SG)

(72) Inventors: Enrique Musoll, San Jose, CA (US); Tsahi Daniel, Palo Alto, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 126 days.

This patent is subject to a terminal disclaimer.

(21) Appl. No.: 16/370,746

(22) Filed: Mar. 29, 2019

(65) Prior Publication Data

US 2019/0227959 A1    Jul. 25, 2019

Related U.S. Application Data

(63) Continuation of application No. 15/434,917, filed on Feb. 16, 2017, now Pat. No. 10,289,575, which is a continuation of application No. 14/673,828, filed on Mar. 30, 2015, now Pat. No. 9,606,942.

(51) Int. Cl.
| | |
|---|---|
| *G06F 13/16* | (2006.01) |
| *G06F 13/40* | (2006.01) |
| *H04L 12/861* | (2013.01) |
| *H04L 12/733* | (2013.01) |

(52) U.S. Cl.
CPC ........ *G06F 13/1663* (2013.01); *G06F 13/161* (2013.01); *G06F 13/1673* (2013.01); *G06F 13/4022* (2013.01); *H04L 45/126* (2013.01); *H04L 49/9005* (2013.01)

(58) Field of Classification Search
None
See application file for complete search history.

(56) References Cited

U.S. PATENT DOCUMENTS

| | | |
|---|---|---|
| 6,501,761 B1 | 12/2002 | Pannell |
| 6,658,016 B1 | 12/2003 | Dai et al. |
| 6,788,701 B1 | 9/2004 | Mahalingaiah |
| 6,876,649 B1 | 4/2005 | Beshai |
| 7,289,537 B1 | 10/2007 | Davangondi et al. |
| 7,680,097 B1 | 3/2010 | Goldstein et al. |
| 7,778,259 B1 | 8/2010 | Mahalingaiah |
| 9,195,622 B1 | 11/2015 | Roitshtein |
| 9,582,440 B2 | 2/2017 | Gabby et al. |
| 2003/0043742 A1 | 3/2003 | De Maria |
| 2003/0105911 A1 | 6/2003 | Jones |
| 2003/0122834 A1 | 7/2003 | Mastonarde |
| 2004/0034748 A1 | 2/2004 | Tomishima |
| 2006/0006905 A1 | 1/2006 | Chou et al. |
| 2006/0104275 A1 | 5/2006 | Dohm |
| 2007/0047535 A1 | 3/2007 | Varma |

(Continued)

OTHER PUBLICATIONS

Office Action for the Chinese Patent Application No. 201610193288.8 dated Dec. 17, 2019.

*Primary Examiner* — Kaushikkumar M Patel

(57) ABSTRACT

A packet processing system having each of a plurality of hierarchical clients and a packet memory arbiter serially communicatively coupled together via a plurality of primary interfaces thereby forming a unidirectional client chain. This chain is then able to be utilized by all of the hierarchical clients to write the packet data to or read the packet data from the packet memory.

38 Claims, 4 Drawing Sheets

(56) References Cited

U.S. PATENT DOCUMENTS

| | | |
|---|---|---|
| 2007/0127469 A1 | 6/2007 | Rashid |
| 2009/0073873 A1 | 3/2009 | MacAdam et al. |
| 2009/0074408 A1 | 3/2009 | Black et al. |
| 2009/0274044 A1 | 11/2009 | Goose |
| 2014/0149602 A1 | 5/2014 | Madaiah et al. |
| 2014/0211634 A1 | 7/2014 | Matthews et al. |
| 2014/0214955 A1 | 7/2014 | Vash et al. |
| 2015/0188850 A1 | 7/2015 | Chan et al. |
| 2015/0312160 A1 | 10/2015 | Griswold et al. |
| 2016/0119220 A1 | 4/2016 | Singh |

PACKET PROCESSING SYSTEM, METHOD AND DEVICE UTILIZING A PORT CLIENT CHAIN

RELATED APPLICATIONS

This Application is a continuation of U.S. application Ser. No. 15/434,917, filed on Feb. 16, 2017, and entitled "PACKET PROCESSING SYSTEM, METHOD AND DEVICE UTILIZING A PORT CLIENT CHAIN" which is a continuation of U.S. application Ser. No. 14/673,828, filed on Mar. 30, 2015, and entitled "PACKET PROCESSING SYSTEM, METHOD AND DEVICE UTILIZING A PORT CLIENT CHAIN," both of which are hereby incorporated by reference.

FIELD OF INVENTION

The present invention relates to a packet processing system. More particularly, the present invention relates to a packet processing system having ring buses.

BACKGROUND OF THE INVENTION

A packet-processing device, like a switch microchip, usually needs to buffer the packets into a packet memory (PM) having one or more banks while the device processes them. Specifically, the ingress ports and the associated ingress port logic (write clients) need to receive packets and write packet data to the packet memory while the device processes portions of the packet. Similarly, the egress ports and the associated egress port logic (read clients) need to read the packet data from the packet memory and output the packets from the device when the processing of the packet has completed. The number of read/write clients needed on the device depends on the bandwidth requirements of the device. In high-performance switch chips, this number can be in the hundreds, so an implementation where each client has a dedicated interface to read or write data to/from the PM is unfeasible due to the large number of wires that are needed to be routed from the clients to the PM. Additionally, the read/write clients are usually physically placed in the periphery of the device (e.g. switch die) whereas the PM is in the middle, thereby exacerbating the problem of routing that many wires between the ports and the PM. As a result, this scheme is not physical friendly because it requires lots of wide interfaces to be routed from the periphery of the die to the center of the die, typically using expensive routing resources (top-level metal layers). Also, due to the large distances these interface busses need to travel, several stages of sequential cells (flops) are needed to be inserted to meet the target clock frequency.

BRIEF SUMMARY OF THE INVENTION

A packet processing system having each of a plurality of hierarchical clients and a packet memory arbiter serially communicatively coupled together via a plurality of primary interfaces thereby forming a unidirectional client chain. This chain is then able to be utilized by all of the hierarchical clients to write the packet data to or read the packet data from the packet memory.

A first aspect is directed to a packet processing system on a packet processing device. The system comprises a non-transitory computer-readable packet memory organized into one or more memory banks, a packet memory arbiter coupled with read ports and write ports of the memory banks of the packet memory and a plurality of ports that are each associated with one of a plurality of hierarchical clients, wherein each of the hierarchical clients and the packet memory arbiter are serially communicatively coupled together via a plurality of primary interfaces thereby forming a unidirectional client chain, and further wherein all of the hierarchical clients write the packet data to or read the packet data from the packet memory via the unidirectional client chain. In some embodiments, the hierarchical clients are each associated with a plurality of the ports and arbitrate between requests to access the packet memory from the plurality of the ports. In some embodiments, the client chain is only used to transmit the packet data to be read out from the packet memory to the ports and the packet memory arbiter is at the beginning of the unidirectional client chain. In some embodiments, the client chain is used both to transmit the packet data to be read out from the packet memory to the ports and to transmit the packet data to be written into the packet memory from the ports, and further wherein the unidirectional client chain forms a loop such that the packet memory arbiter is at the beginning and the end of the unidirectional client chain. In some embodiments, the client chain is only used to transmit the packet data to be written into the packet memory from the ports and the packet memory arbiter is at the end of the unidirectional client chain. In some embodiments, one or more of the hierarchical clients are directly coupled to the packet memory arbiter separately from the unidirectional client chain via one or more secondary interfaces, and further wherein the secondary interfaces are only used to transmit the packet data to be read out from the packet memory to the ports. In some embodiments, the unidirectional client chain further comprises one or more additional write clients that are unaffiliated with the ports and configured to write the packet data into the packet memory. In some embodiments, the system further comprises a plurality of additional ports that are each associated with one of a plurality of additional hierarchical clients, wherein each of the additional hierarchical clients and the packet memory arbiter are serially communicatively coupled together via a plurality of additional interfaces thereby forming an additional unidirectional client chain, and further wherein all of the additional hierarchical clients write the packet data to or read the packet data from the packet memory via the additional unidirectional client chain. In some embodiments, each cycle the packet memory arbiter is configured to limit a sum of a number of the ports and a number of the additional ports that are granted access to write the packet data into the one or more memory banks of the packet memory such that the sum is equal to or less than the number of write ports of the memory banks. In some embodiments, the additional unidirectional client chain and the unidirectional client chain have substantially the same latency. In some embodiments, the primary interfaces and the secondary interfaces are wide interfaces having a large bandwidth. In some embodiments, the hierarchical clients are configured to transmit the requests to access the packet memory from the plurality of the ports to the packet memory arbiter, wherein each of the requests include a request tag that identifies the one of the ports that initiated the request and the hierarchical client to which the port belongs. In some embodiments, after granting one of the requests, the packet memory arbiter transmits a return tag to the port that sent the request via the associated hierarchical client, wherein the return tag identifies the associated hierarchical client and the port that sent the request, and further wherein the return tag indicates to the port that sent the request when to write packet data to or read packet data from the unidirectional client chain in order to fulfill the requested access to the packet memory.

A second aspect is directed to a packet memory arbiter stored on a non-transitory computer-readable memory, wherein the packet memory arbiter is configured to arbitrate between a plurality of requests sent by one or more of a plurality of ports to access read ports or write ports of memory banks of a packet memory by granting one of the requests, wherein each of the ports are associated with one of a plurality of hierarchical clients and after granting the one of the requests, transmitting a return tag to the port that sent the request via the associated hierarchical client, wherein the return tag identifies the associated hierarchical client and the port that sent the request, and further wherein the return tag indicates to the port that sent the request when to write packet data to or read packet data from a unidirectional client chain such that the requested access to the packet memory by the request is able to be fulfilled. In some embodiments, each of the hierarchical clients and the packet memory arbiter are serially communicatively coupled together via a plurality of primary interfaces thereby forming the unidirectional client chain. In some embodiments, the packet memory arbiter is further configured to at least one of: receive via the unidirectional client chain packet data that is to be written into the packet memory from the hierarchical clients, and output via the unidirectional client chain packet data that is to be read out from the packet memory to the hierarchical clients. In some embodiments, the hierarchical clients arbitrate between requests to access the packet memory from the plurality of the ports. In some embodiments, the unidirectional client chain is only used to transmit the packet data to be read out from the packet memory to the ports and the packet memory arbiter is at the beginning of the unidirectional client chain. In some embodiments, the client chain is used both to transmit the packet data to be read out from the packet memory to the ports and to transmit the packet data to be written into the packet memory from the ports, and further wherein the unidirectional client chain forms a loop such that the packet memory arbiter is at the beginning and the end of the unidirectional client chain. In some embodiments, the client chain is only used to transmit the packet data to be written into the packet memory from the ports and the packet memory arbiter is at the end of the unidirectional client chain. In some embodiments, one or more of the hierarchical clients are directly coupled to the packet memory arbiter separately from the unidirectional client chain via one or more secondary interfaces, and further wherein the secondary interfaces are only used to transmit the packet data to be read out from the packet memory to the ports. In some embodiments, the unidirectional client chain further comprises one or more additional write clients that are unaffiliated with the ports and configured to write the packet data into the packet memory. In some embodiments, a plurality of additional ports are each associated with one of a plurality of additional hierarchical clients, and further wherein each of the additional hierarchical clients and the packet memory arbiter are serially communicatively coupled together via a plurality of additional interfaces thereby forming an additional unidirectional client chain, and further wherein all of the additional hierarchical clients write the packet data to or read the packet data from the packet memory via the additional unidirectional client chain. In some embodiments, each cycle the packet memory arbiter is configured to limit a sum of a number of the ports and a number of the additional ports that are granted access to write the packet data into the one or more memory banks of the packet memory such that the sum is equal to or less than the number of write ports of the memory banks. In some embodiments, the additional unidirectional client chain and the unidirectional client chain have substantially the same latency. In some embodiments, the primary interfaces and the secondary interfaces are wide interfaces having a large bandwidth. In some embodiments, the hierarchical clients are configured to transmit the requests to access the packet memory from the plurality of the ports to the packet memory arbiter, wherein each of the requests include a request tag that identifies the one of the ports that initiated the request and the hierarchical client to which the port belongs.

A third aspect is directed to a method of utilizing a unidirectional client chain in a packet processing system. The method comprises transmitting a plurality of requests for access of memory banks of a packet memory to a packet memory arbiter from one or more of a plurality of ports that are each associated with one of a plurality of hierarchical clients, wherein each of the hierarchical clients and the packet memory arbiter are serially communicatively coupled together via a plurality of primary interfaces thereby forming the unidirectional client chain, arbitrating between the plurality of requests with the packet memory arbiter by granting one of the requests and transmitting packet data associated with the granted request between the memory banks of the packet memory and the port that sent the granted request via the unidirectional client chain. In some embodiments, the method further comprises after granting the one of the requests, transmitting with the packet memory arbiter a return tag to the port that sent the request via the associated hierarchical client, wherein the return tag identifies the associated hierarchical client and the port that sent the request, and further wherein the return tag indicates to the port that sent the request when to write packet data to or read packet data from a unidirectional client chain such that the requested access to the packet memory by the request is able to be fulfilled. In some embodiments, the hierarchical clients arbitrate between requests to access the packet memory from the plurality of the ports. In some embodiments, the unidirectional client chain is only used to transmit the packet data to be read out from the packet memory to the ports and the packet memory arbiter is at the beginning of the unidirectional client chain. In some embodiments, the client chain is used both to transmit the packet data to be read out from the packet memory to the ports and to transmit the packet data to be written into the packet memory from the ports, and further wherein the unidirectional client chain forms a loop such that the packet memory arbiter is at the beginning and the end of the unidirectional client chain. In some embodiments, the client chain is only used to transmit the packet data to be written into the packet memory from the ports and the packet memory arbiter is at the end of the unidirectional client chain. In some embodiments, one or more of the hierarchical clients are directly coupled to the packet memory arbiter separately from the unidirectional client chain via one or more secondary interfaces, and further wherein the secondary interfaces are only used to transmit the packet data to be read out from the packet memory to the ports. In some embodiments, the unidirectional client chain further comprises one or more additional write clients that are unaffiliated with the ports and configured to write the packet data into the packet memory. In some embodiments, a plurality of additional ports are each associated with one of a plurality of additional hierarchical clients, and further wherein each of the additional hierarchical clients and the packet memory arbiter are serially communicatively coupled together via a plurality of additional interfaces thereby forming an additional unidirectional client chain, and further wherein all of the additional hierarchical clients write the packet data to or read the packet data from the packet memory via the additional unidirectional client chain. In some embodiments, the method further comprises each cycle limiting with the packet memory arbiter a sum of a number of the ports and a number of the additional ports that are granted access to write the packet data into the one or more memory banks of the packet memory such that the sum is equal to or less than the number of write ports of the memory banks. In some embodiments, the additional unidirectional client chain and the unidirectional client chain have substantially the same latency. In some embodiments, the primary interfaces and the secondary interfaces are wide interfaces having a large bandwidth. In some embodiments, each of the requests include a request tag that identifies the one of the ports that initiated the request and the hierarchical client to which the port belongs.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded with the widest scope consistent with the principles and features described herein.

Embodiments are directed to a packet processing system having each of a plurality of hierarchical clients and a packet memory arbiter serially communicatively coupled together via a plurality of primary interfaces thereby forming a unidirectional client chain. This chain is then able to be utilized by all of the hierarchical clients to write the packet data to or read the packet data from the packet memory. As a result, the system provides the advantage of minimizing the length and/or number of wide interfaces/buses that to be routed from the periphery of the device/die to the center of the device/die because the unidirectional chain/series only requires coupling between the adjacent hierarchical clients on the periphery and a single coupling to the center of the device/die. Thus, this reduces the need to expend expensive routing resources (top-level metal layers) on a greater number of such wide interfaces/buses. Additionally, by reducing the distances that the wide interfaces/buses need to travel, the system minimizes the need for several stages of sequential cells (flops) to meet the target clock frequency.

Figure 1:
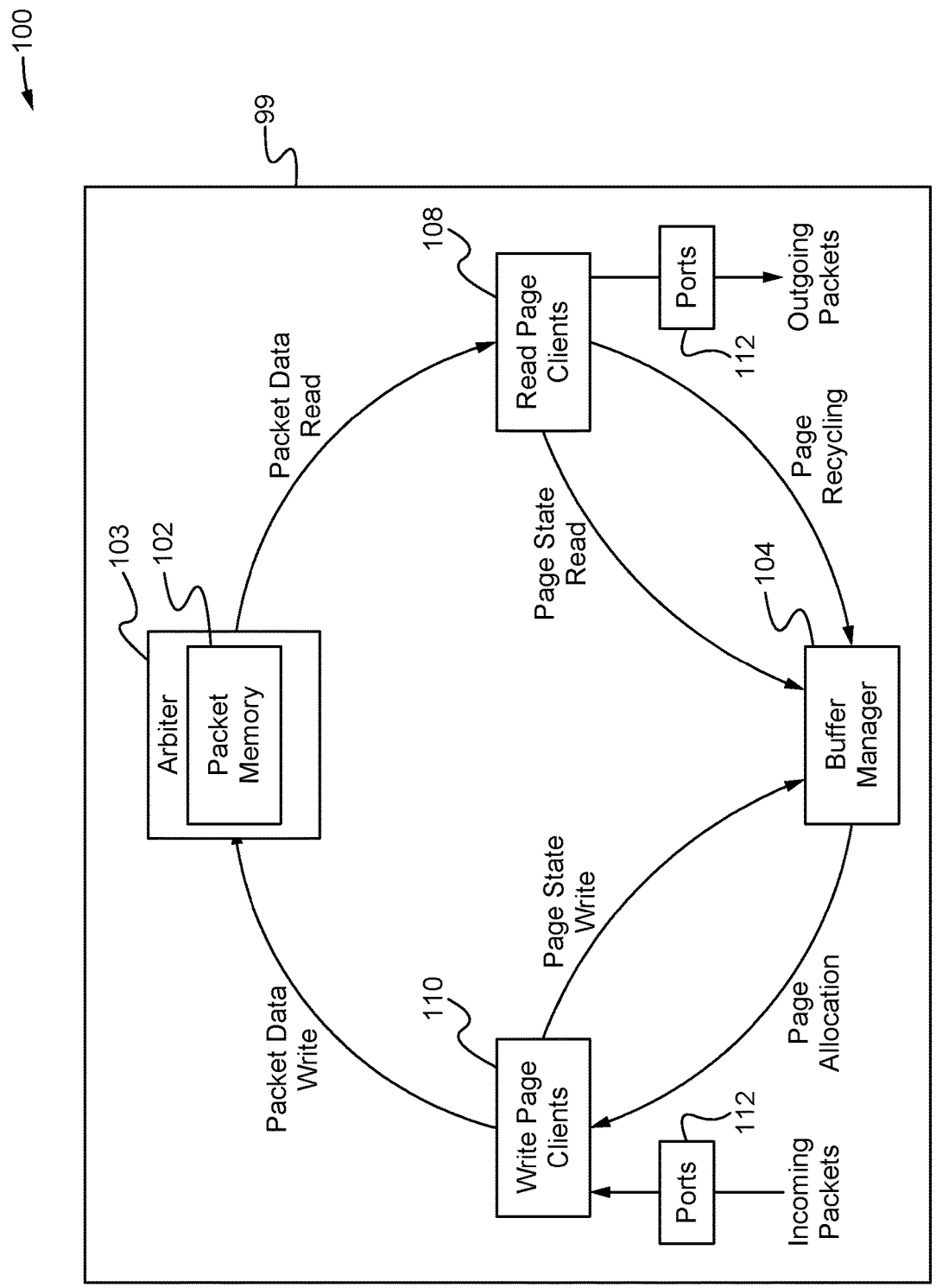
FIG. 1 illustrates a packet processing system on a packet processing device according to some embodiments.

FIG. 1 illustrates a packet processing system 100 on a packet processing device 99 according to some embodiments. As shown in FIG. 1, the packet processing system 100 comprises packet memory 102, a packet memory arbiter 103, buffer memory 104, hierarchical read clients 108, hierarchical write clients 110 and one or more ports 112 all operably coupled together via a network. The ports 112 are able to be positioned around the perimeter of the device 99 whereas the packet memory 102 is centrally positioned on the device 99 (e.g. at the center). The network is able to comprise a plurality of wide or narrow interfaces or buses (see FIGS. 2-4) that communicatively couple together the components of the system 100 for transmitting packet data and/or control signals between the components. The packet processing device 99 is able to be a packet processing circuit, microchip and/or a die. For example, the device 99 is able to be a switch microchip (e.g. top of rack switch) for a data center or other type of packet processing circuit or application specific integrated circuit. In some embodiments, the device 99 is a software defined network programmable microchip that is able to be programmed or customized to adjust the manner in which packets are processed. Alternatively, the device 99 is able to be other types of packet processing devices known in the art.

The packet memory 102 comprises a plurality of non-transitory computer-readable physical memory units that are logically organized into a plurality of memory banks each having one or more read ports and one or more write ports. When the packet data of incoming packets is stored on the packet memory 102, it is stored on one or more pages that map to one or more of the memory units of the packet memory 102. As a result, when packet data is stored on a page, instead of being all stored sequentially in the same location in the packet memory 102, the packet data is distributed across multiple physical memory units of the packet memory that are mapped to by the page. The packet memory arbiter 103 arbitrates between multiple requests for access of the packet memory 102 from the ports 112 (via the associated clients 202, 202') each cycle, grants access to a number of the requests and facilitates the writing into and reading out of packet data to and from the banks of the packet memory 102 to fulfill the requests via the read and write ports of each of the banks. Thus, the packet memory arbiter 103 essentially serves as a controller or brain of the packet memory 102 that handles the communications with the ports 112. In some embodiments, the packet memory 102 comprises a content-addressable memory (CAM). Alternatively, the packet memory 102 is able to comprise CAM, a ternary content-addressable memory (TCAM), a random access memory (RAM), a static random access memory (SRAM), other types of memory known in the art or combinations thereof. The packet memory arbiter 103 is able to comprise hardware, software or a combination of hardware and software, wherein the software is stored on a non-transitory computer readable medium of the device 99. In some embodiments, the packet memory arbiter 103 comprises a plurality of independent arbiters that separately arbitrate for different sets of one or more ports of the memory banks. In other words, each arbiter is able to be dedicated to a different particular one or plurality of ports of the memory banks and handle the granting of requests, the reading data out from and/or writing data into the memory bank via the associated port or ports.

Figure 2:
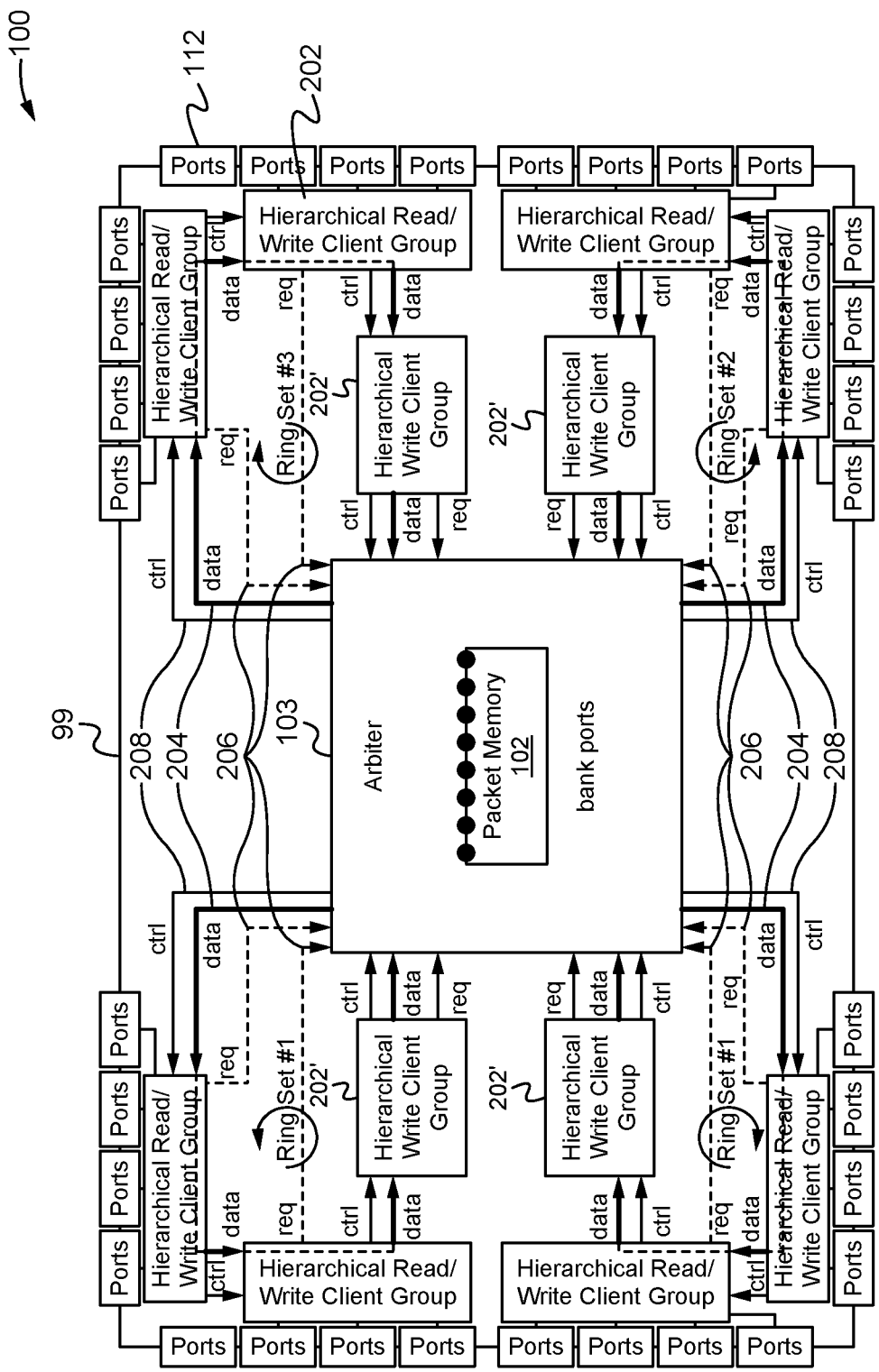
FIG. 2 illustrates an exemplary connective setup of the interfaces of the processing system according to some embodiments.
Figure 3:
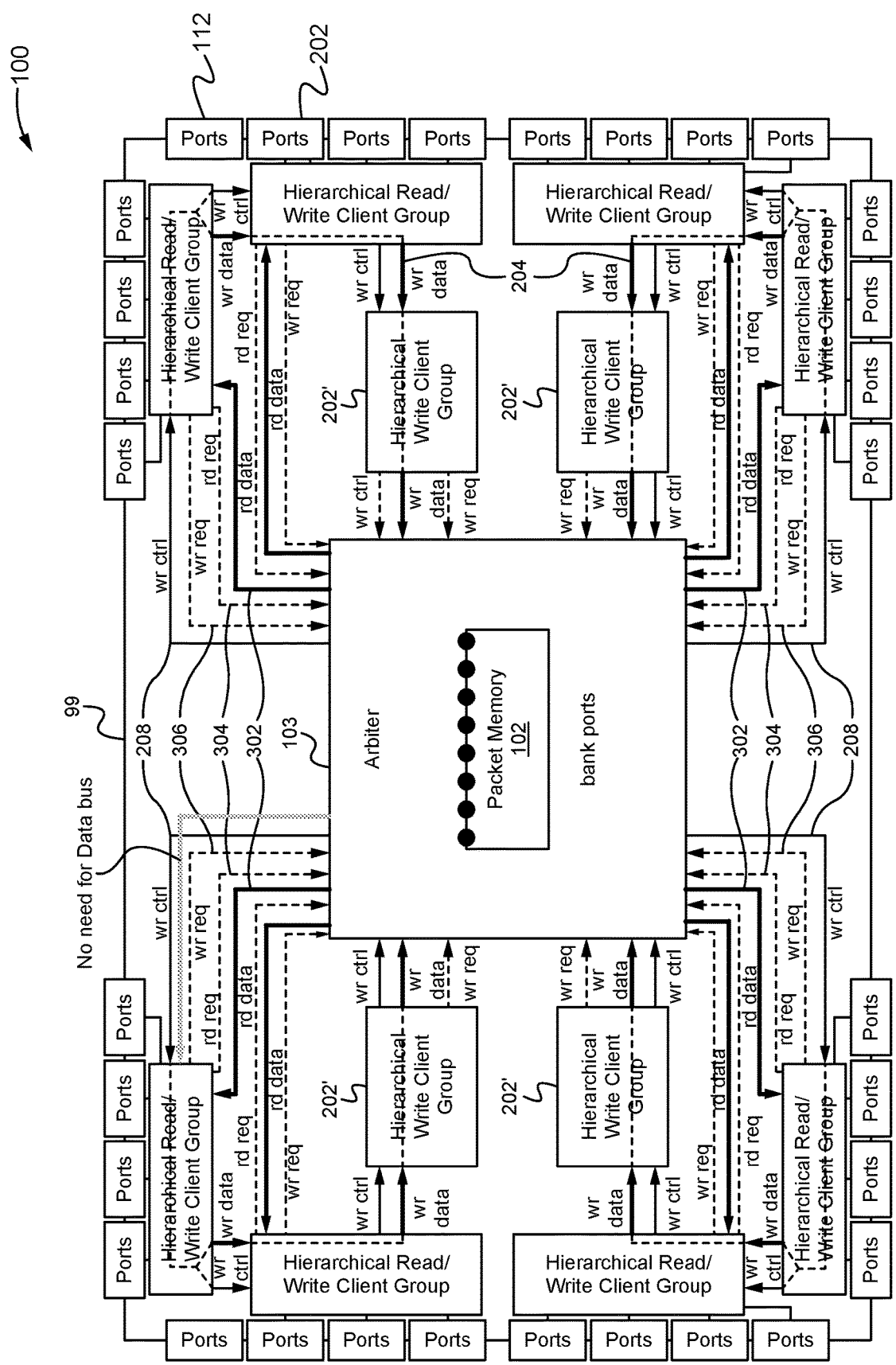
FIG. 3 illustrates another exemplary connective setup of the interfaces of the processing system according to some embodiments.

Each of the ports 112 is able to both input and output packets and thus each of the ports 112 has an associated read client that enables the port 112 to read out packet data that from the packet memory 102 for outputting the packet data from the port 112 and an associate write client that enables the port 112 to write packet data into the packet memory 102 for storing packet data of incoming packets. These clients are able to be formed into groups (e.g. groups of clients associated with neighboring/adjacent ports 112 on the device 99). Further, the groups of clients are able to be further combined into larger groups of groups of clients (e.g. neighboring/adjacent groups) and so on until a final set of groups are formed as the hierarchical read and/or write client groups 108, 110. In this way, each of the hierarchical read and write clients 108, 110 is associated with and implements the functionality of a plurality of the ports 112. However, unlike the individual write or read clients, the hierarchical clients 108, 110 also arbitrate each cycle between requests from the ports/clients that form the hierarchical client 108, 110 such that only a chosen number of the requests are performed that cycle and the remainder or left for a subsequent cycle. As shown in FIG. 1, the hierarchical read clients 108 and the hierarchical write clients 110 are shown as separate groups. Alternatively, the hierarchical read and write clients 108, 110 of the same set of ports 112 are able to operate as a single hierarchical read/write client group 202 as shown in FIGS. 2 and 3.

In some embodiments, one or more of the hierarchical write clients 110 are able to not be associated with any of the ports 112. In particular, these independent hierarchical write clients 202' (see FIG. 2) are able to store the header of a packet (after it has been processed and/or modified by the device 99) into the packet memory 102 until the packet data (including the header) are ready to be read out by one or more hierarchical read clients 108 and output by the ports 112 associated with the hierarchical read clients 108. Thus, instead of a port 112, these write clients receive packet data from and/or implement the write functions of the header processing block (not shown) of the device 99. In any case, in order to perform the above functionality, the hierarchical read and write clients 108, 110 are each able to comprise hardware, software or a combination of hardware and software configured to perform the functions of the associated ports 112 as described herein, wherein the software is stored on a non-transitory computer readable medium of the device 99.

The buffer manager 104 stores and maintains pages and page state data used by the hierarchical clients 108, 110 to write and/or read packet data into and/or out of the packet memory 102. Thus, the hierarchical clients 108, 110 must access the buffer manager 104 each time they have a page that they need to access the packet memory 102 for writing or reading the packet data of the page. In this way, the buffer manager 104 is able to control the system 100.

In operation, each time a port 112 associated with a hierarchical write client 110 receives an incoming packet, the hierarchical write client 110 requests a page to store the packet data of the packet from the buffer manager 104. In response to the request, the buffer manager 104 selects and allocates a page to the hierarchical write client 110 for the packet data of the packet. Upon receiving the allocated page 212, the hierarchical write clients 110 write the packet data on the allocated page of the packet memory 102. At the same time, when the ports 112 associated with hierarchical read clients 108 are ready to output outgoing packets, the hierarchical read clients 108 locate and read some or all of the packet data from the page or pages of packet memory 102 where packet data is stored. As a result, the hierarchical read clients 108 are then able to output the packet data of the outgoing packet from the associated ports 112. Each time a hierarchical read client 108 indicates that the packet data stored on a page has been read such that it no longer needs to be stored for that packet, the hierarchical read client 108 indicates to the buffer manager 104 to recycle the page so that it becomes available to write clients. Therefore, during the course of operation, the hierarchical read and write clients 108, 110 need to repeatedly write packet data from the ports 112 into the packet memory 102 and read packet data out of the packet memory 102 to the ports 112. The transfer of this data requires wide interfaces/buses (e.g. having a large amount of bandwidth) be used to reduce the latency of all of these transfers.

FIG. 2 illustrates an exemplary connective setup of the interfaces of the processing system 100 according to some embodiments. As shown in FIG. 2, each of the ports 112 are coupled to a hierarchical read/write client group 202, and the groups 202, 202' and the packet memory arbiter are serially coupled into four unidirectional rings (or looped chains) via a plurality of data buses/interfaces 204. Similarly, a plurality of control buses/interfaces 208 are also used to serially couple together the groups 202, 202' of the rings with the packet memory 102 (via the packet memory arbiter 103) forming control rings (whereas the data interfaces 204 formed data rings). Each of the groups 202, 202' is further directly coupled to the packet memory arbiter 103 via at least one request bus/interface 206 for submitting packet memory access requests to the arbiter 103. In some embodiments, the packet memory arbiter 103 is directly coupled to each of the groups 202, 202' via at least one grant bus/interface (not shown) for indicating when one of the requests has been granted by the packet memory arbiter 103. The data interfaces 204 are wide or high bandwidth buses that are able to quickly transmit large quantities of data. For example, the data interfaces 204 are able to comprise top level metal layers of the device 99 (e.g. die). In contrast, the request interfaces 206 and/or control interfaces 208 are able to be narrow or lower bandwidth buses that cannot transmit as much data as quickly as the data interfaces 204, but are less costly. In some embodiments, the wide bandwidth buses (e.g. the data bus (and/or combined control bus)) have a width of between 100 and 10,000 bits meaning that up to and between 100 and 10,000 bits are able to be transmitted in parallel each cycle. In some embodiments, the narrow bandwidth busses (e.g. the request buses) have a width of between 1 and 99 bits (e.g. 1) meaning that up to and between 1 and 99 bits are able to be transmitted in parallel each cycle. Alternatively, the wide buses and/or the narrow buses are able to have other ranges of widths, wherein the wide buses are wider than the narrow buses. For example, the wide buses are able to be an order of magnitude wider than the narrow buses (e.g. 10 vs. 100 bits). Additionally, the narrow buses described herein are able to utilize fewer flops to meet timing needs than the wide buses. It should be noted that all of the types of buses described herein (data, control, request) are able to have a throughput between a source and a destination (e.g. flops, client groups) of 1 meaning that one event is sent per cycle.

In operation, in each of the groups 202, 202', when one or more of the ports 112 of that group 202, 202' need to write packet data to or read packet data out from the packet memory 102, the ports 112 issue requests to the group 202, 202' which arbitrates between the requests and transmits a selected one of the requests to the packet memory arbiter 103 via the request interface 206. The requests each comprise a tag having indicators that indicate the group 202, 202' that sent the request and that indicate the port 122 within the group 202, 202; that initiated the request. Further, if the request relates to a read transaction (where packet data needs to be read out from the packet memory 102), the request also comprises the address within the memory bank of the packet memory 102 where the packet data that needs to be read out is stored. The requests transmitted from all of the groups are then received by the packet memory arbiter 103 which each cycle grants one or more of the requests by sending a grant notification to the group 202, 202' that send the request via a grant interface (not shown).

In particular, this arbitration is able to be for each memory bank and for each type of request (e.g. read or write) such that at least one request is granted from the pool of read requests relating to each of the memory banks and the pool of write requests relating to each of the memory banks. Indeed, more than one request per bank per type (read or write) is able to be granted, for example, if the bank comprises a plurality of that type of port (read or write) and/or in other circumstances. In some embodiments, regarding write requests, the arbiter 103 is able to be configured to limit the number of granted write requests each cycle to the number of writes that can be performed by that arbiter during a single cycle (e.g. the number of write ports of the memory banks associated with that pool of write requests). In particular, this is able to provide the advantage of preventing a situation where in a single cycle there are more sets of packet data received that need to be written into a bank or set of banks than the number of write ports of that bank or set of banks (meaning an error will occur or buffering is required). In such embodiments, each of the rings (or chains as described below) associated with one or more memory banks are able to be configured to have the same latency such that packet data associated with the granted requests of a cycle will all be received by the arbiter 103 during the same cycle in the future (due to the equivalent latencies of the rings/chains).

If the request was for a read transaction, the arbiter 103 initiates the read of the packet data of the memory bank at the address indicated by the request. Once the arbiter 103 obtains the requested packet data, the arbiter 103 transmits the packet data onto a data interface 204 of the unidirectional ring toward the group 202, 202' that sent the request. Concurrently, subsequently or simultaneously, the arbiter 103 sends a control message on the control interface 208 forming the control ring that follows the same path as the data ring of the data interface 204. As a result, both the packet data and the control message move down the respective data and control rings traversing each group 202, 202' until the source group 202, 202' is reached. In particular, each of the groups 202, 202' are configured to forward any packet data and/or control data that is not for them further down the ring to the next group 202, 202' (via the data interface 204 and the control interface 208). Then, the group 202, 202' that initiated the request for the packet data is able to recognize the data when it is received from the ring based on the control message when it is received. The port 122 is then able to receive the requested packet data from the ring and output the packet data from the port 122 as needed.

For a read request, the control message is able to comprise a return tag that indicates to the group 202, 202' and/or port 112 that sent the request that the packet data on the ring is for that group 202, 202' and/or port 112 and therefore should be input by that group 202, 202' and/or port 112. For example, the return tag is able to include a packet data identifier that the group 202, 202' and/or port 112 are able to use to identify the packet data when it is received via the ring. Alternatively, the return tag is able to include a slot or cycle identifier that indicates a slot of the ring where the desired packet data is located and/or a cycle (e.g. time slot) when the desired packet data will be received by the group 202, 202' and/or port 112. Further, the control message is able to indicate the group 202, 202' and/or the port 122 that initiated the request such that the group 202, 202' and/or port 122 are able to recognize that the control message is for them. It should be noted that each of the buses are able to comprise a plurality of sections (e.g. sections of the bus pipeline) wherein all of the sections forward one unit of data from the source (e.g. a flop, a client, the arbiter) of the section to the destination (e.g. a flop (not shown), a client, the arbiter) of the section each cycle. As a result, the total number of data units that are able to be forwarded by the bus each cycle (e.g. one or one set per section) represent the number of slots of that bus (e.g. a chain of slots), wherein the slots are able to be filled with data units or empty as they traverse the bus. Accordingly, a slot is able to refer to a time when a portion of the slot chain reaches a particular location and/or a relative position of data or a lack of data within the pipeline of a bus with respect to the total number of positions of data or lack of data forwarded along through the bus.

If the request was for a write transaction, the arbiter 103 reserves a slot on the ring for the packet data that needs to be written to be transmitted onto the ring by sending a control message reserving the slot on the control interface 208 of the control ring that follows the same path as the ring. As a result, both the reserved slot and the control message move down the respective data and control rings traversing each group 202, 202' until the source group 202, 202' is reached. As described above, each of the groups 202, 202' are configured to forward any packet data and/or control data that is not for them further down the data and/or control ring to the next group 202, 202' (via the data interface 204 and the control interface 208). Then, the group 202, 202' that initiated the request for the packet data is able to recognize the reserved slot of the data ring based on the control message when it is received. The port 122 that made the request then able to place the packet data along with an address within the packet memory where the packet data needs to be written into the slot of the ring and transmitted along the ring ultimately to the arbiter 103 which then writes the packet data into the address of the packet memory 102.

For a write request, the control message is able to comprise a return tag identifying the group 202, 202' and/or port 122 that sent the request, a valid data indicator (e.g. bit) that indicates the slot is valid, and/or other indicators that indicate to the group 202, 202' and/or port 112 that sent the request that the slot on the ring is for that group 202, 202' and/or port 112 and therefore should be used to write the packet data on the ring by that group 202, 202' and/or port 112. For example, the return tag is able to include a slot identifier that the group 202, 202' and/or port 112 are able to use to identify the slot of the ring when it reaches the group 202, 202' and/or port 112. Alternatively, the return tag is able to include a slot or cycle identifier that indicates a slot of the ring where the slot is located and/or a cycle (e.g. time slot) when the slot will reach the group 202, 202' and/or port 112. Therefore, in any case, the system 100 provides the advantage of enabling the use of the data rings instead of separate direct lines which are costly. Additionally, it should be noted that the groups 202, 202' continually submit requests even if a previous request has been granted but not yet completed in order to maximize efficiency of the requesting and granting process.

Further, although as shown in FIG. 2, each of the rings comprise hierarchical read/write client groups 202 that include both read and write clients, in some embodiments the groups are able to comprise hierarchical groups of solely read clients or hierarchical groups of solely write clients. In such embodiments, instead of a full ring, the hierarchical write client groups have data interfaces 204 that form a unidirectional serial chain that ends at the packet memory arbiter 103. This is because the write clients forming the groups do not need to receive/read out packet data from the packet memory 102, rather they only need to write packet data into the packet memory 102 such that data interfaces 204 only need to couple each of the groups together serially and the last group to the packet memory arbiter 103 to receive from the groups via the chain all the packet data to be written. Similarly, instead of a full ring, the hierarchical read client groups have data interfaces 204 that form a unidirectional serial chain that begins at the packet memory arbiter 103. This is because the read clients forming the groups do not need to send/write packet data into the packet memory 102, rather they only need to read/receive packet data from the packet memory 102 such that data interfaces 204 only need to couple each of the groups together serially and the first group to the packet memory arbiter 103 to send out on the chain all the packet data that needs to be read out. Thus, in such embodiments instead of sharing the same data interfaces 204, the hierarchical read client groups and the hierarchical write client groups are able to use different data interfaces 204 to form separate read chains and write chains. Additionally, because they are separated, the hierarchical read client groups and the hierarchical write client groups are able to use different control interfaces 208 and/or request interfaces 206. Alternatively, one or more of the control interfaces 208 and/or request interfaces 206 are able to be shared by two or more of the chains.

Additionally, although as shown in FIG. 2 the system comprises four rings, more or less rings are contemplated wherein the ports 112/groups 202, 202' are able to be equally or unequally divided amongst the rings. Further, instead of just one ring, each of the rings shown in FIG. 2 is able to represent a set of a plurality of rings that each comprise the same groups 202, 202'. Specifically, the data, control and/or request interfaces 204, 206, 208 that are coupled to the groups 202, 202' of the ring are able to be duplicated thereby forming a plurality of matching rings. Indeed, in some embodiments these "sub" rings of each ring set are able to divide up the memory banks and/or ports of the memory banks of the packet memory 102 such that each sub ring is reserved for packet data, control messages and/or request relating to writing data to or reading data from the associated portion of the memory banks and/or ports of the memory banks. For example, for each ring set there is able to be a separate sub ring for each memory bank of the packet memory 102 or each port of each memory bank of the packet memory 102. Finally, although as shown in FIG. 2 each ring comprises two groups 202 and one group 202', each of the rings is able to comprise more or less groups 202 and/or more or less groups 202'. For example, in some embodiments one or more of the groups 202' are able to be omitted from one or more of the rings entirely.

FIG. 3 illustrates another exemplary connective setup of the interfaces of the processing system 100 according to some embodiments. FIG. 3 is able to be substantially similar to FIG. 2 except for the differences described herein. Specifically, unlike FIG. 2 wherein the ring is used for both reading and writing packet data, in FIG. 3 one or more of the groups 202 are separately directly coupled to the arbiter 103 via read interfaces 302 such that the groups 202 only use the ring for writing packet data. These read interfaces 302 are able to be wide interfaces like the interfaces 204 of FIG. 2. Further, because the ring is only used for writing packet data, the data interface 204 between arbiter 103 and the first group 202, 202' is removed because it is no longer necessary to read data out from the packet memory 102 onto the ring. Thus, each ring becomes a unidirectional serial chain starting with each of the groups 202, 202' and ending with the packet memory arbiter 103, wherein the interfaces 204, 208 of the chain become solely write data interfaces 204 and solely write control interfaces 208. Additionally, the read and write request interfaces 206 of FIG. 2 are decoupled in FIG. 3 to be separate read request interfaces 304 dedicated solely to read requests and write request interfaces 306 dedicated solely to write requests. In operation, the system of FIG. 3 operates similarly to that of FIG. 2 except that the read packet data and/or control messages are sent via the buses 302 and the write packet data and/or control messages are sent via the buses 204, 208. Therefore, the system 100 of FIG. 3 is able to provide the advantage of maintaining low latency for the read requests while minimizing the costs of the data interfaces 204 for the write requests. Additionally, in some embodiments control messages are not necessary such that the interfaces 302 only represent data interfaces similar to the interfaces 204. Alternatively, the interfaces 302 are able to represent both control and data interfaces and thus two separate buses wherein the control bus is the same as the control interfaces 208 and the data bus is the same as the data buses 204.

Figure 4:
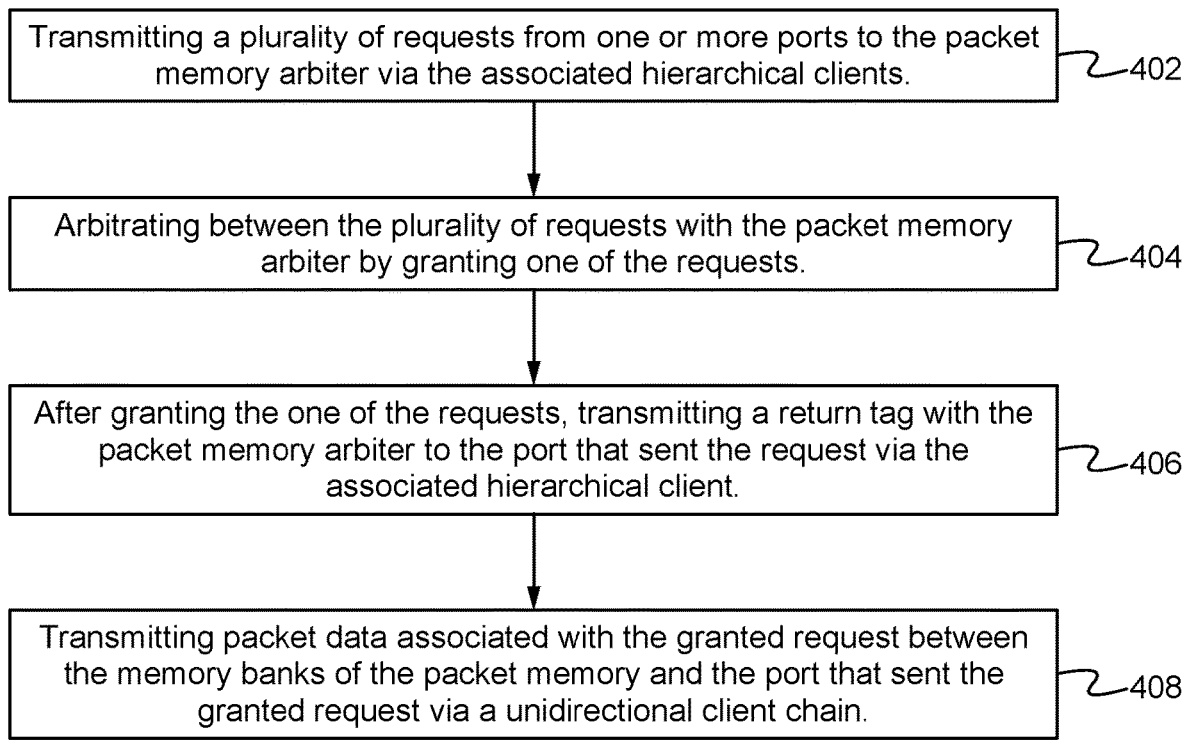
FIG. 4 illustrates a method of utilizing a unidirectional client chain in a packet processing system according to some embodiments.

FIG. 4 illustrates a method of utilizing a unidirectional client chain in a packet processing system 100 according to some embodiments. As shown in FIG. 4, a plurality of requests are transmitted from one or more ports 112 to the packet memory arbiter 204 via the associated hierarchical clients (or client groups) 202 at the step 402. Each of the requests are able to include a request tag that identifies the one of the ports 112 that initiated the request and the hierarchical client 202 to which the port 112 belongs. In some embodiments, each cycle the hierarchical clients 202 arbitrate between all of the requests to access the packet memory from the plurality of the ports 112 that they are associated with such that only one of the requests is selected and transmitted to the packet memory arbiter 204 that cycle. The packet memory arbiter 204 arbitrates between the plurality of requests by granting one of the requests at the step 404. After granting the one of the requests, the packet memory arbiter 204 transmits a return tag to the port 112 that sent the request via the associated hierarchical client 204 at the step 406. The packet memory arbiter 204 or hierarchical clients (or client groups) 202 transmit packet data associated with the granted request between the memory banks of the packet memory 102 and the port 112 that sent the granted request via a unidirectional client chain at the step 408.

In particular, as described above, the return tag identifies the associated hierarchical client 202 and the port 112 that sent the request, as well as information (e.g. time/cycle slot information) indicating to the port 112 (and the associate client group 202) when to write packet data to or read packet data from a unidirectional client chain such that the requested access to the packet memory 102 is able to be fulfilled. In some embodiments, one or more of the read clients 202 have separate interfaces to the packet memory arbiter 204 separate from the chain such that the method further comprises upon granting a read request from such a read client 202, reading out and transmitting packet data from the packet memory 102 to the read ports 112 via the separate wide interfaces independent of the chain. In some embodiments, the method is repeated for one or more additional chains of clients 202 and the associated ports 112. In some embodiments, the method further comprises each cycle limiting with the packet memory arbiter 204 the number of the ports 112 that are granted access to write the packet data into the one or more memory banks of the packet memory 102 to be equal to or less than the number of write ports of the memory banks. In particular, if the latency is kept substantially similar or the same in each of the chains, this provides the advantage of ensuring that no packet data that needs to be written cannot when it is received because the write port of the memory bank being used for a different set of packet data. Further, the method provides the advantage of indicating to the arbiter 204 both the group 202 and the port 112 that each request is from which is necessary because requests from different groups 202 and ports 112 are all received via the same unidirectional client chain. Moreover, the method provides the advantage of including return tags that enable the ports 112 that made the granted requests to know when to access the unidirectional client chain (e.g. which slot of the chain to upload or download data from/to) in order to transmit or receive the packet data that was the object of the granted request.

The packet processing system described herein has numerous advantages. In particular, the system provides the advantage of minimizing the length and/or number of wide interfaces/buses that to be routed from the periphery of the device/die to the center of the device/die because the unidirectional chain/series only requires coupling between the adjacent hierarchical clients on the periphery and a single coupling to the center of the device/die. Thus, this reduces the need to expend expensive routing resources (top-level metal layers) on a greater number of such wide interfaces/buses. Additionally, by reducing the distances that the wide interfaces/buses need to travel, the system minimizes the need for several stages of sequential cells (flops) to meet the target clock frequency. Further, the system is able to advantageously prevent the need to buffer packet data at the packet memory arbiter by matching the latency of the chains and only granting as many access requests to the ports as there are write ports of the associated memory banks. Moreover, the system is able to provide the benefit of supplying direct wide buses/interfaces to the packet memory for the hierarchical read clients in order to minimize the read latency while still minimizing the interfaces needed for the hierarchical write clients by utilizing a chain for those clients.

While the invention has been described with reference to numerous specific details, one of ordinary skill in the art will recognize that the invention can be embodied in other specific forms without departing from the spirit of the invention. For example, in some embodiments in each set of chains the system comprises a separate chain for each input port of each of the memory banks of the packet memory. Additionally, although the different methods and operations described herein describe a particular order of steps, other orders are contemplated as well as the omission of one or more of the steps and/or the addition of one or more new steps. Moreover, although the methods and operations above are described herein separately, one or more of the methods and operations are able to be combined (in whole or part). Thus, one of ordinary skill in the art will understand that the invention is not to be limited by the foregoing illustrative details, but rather is to be defined by the appended claims.

We claim:

1. A packet processing system on a packet processing device, the system comprising:
    a non-transitory computer-readable packet memory organized into one or more memory banks;
    a packet memory arbiter coupled with read ports and write ports of the one or more memory banks of the packet memory; and
    a plurality of system ports that are each associated with one of a plurality of hierarchical clients, wherein one or more of the hierarchical clients are configured to transmit requests to access the packet memory from the plurality of the plurality of system ports to the packet memory arbiter, wherein each of the requests include a request tag that identifies the one of the plurality of system ports that initiated the request and the hierarchical client with which the one of the plurality of system ports is associated.

2. The system of claim 1, wherein the plurality of hierarchical clients are each associated with a plurality of the plurality of system ports and arbitrate between the requests to access the packet memory from the plurality of the plurality of system ports.

3. The system of claim 2, wherein the hierarchical clients form a client chain and the client chain is only used to transmit the packet data to be read out from the packet memory to the plurality of system ports and the packet memory arbiter is at the beginning of the client chain.

4. The system of claim 2, wherein the client chain is used both to transmit the packet data to be read out from the packet memory to the plurality of system ports and to transmit the packet data to be written into the packet memory from the plurality of system ports, and further wherein the client chain forms a loop such that the packet memory arbiter is at the beginning and the end of the client chain.

5. The system of claim 2, wherein the client chain is only used to transmit the packet data to be written into the packet memory from the plurality of system ports and the packet memory arbiter is at the end of the client chain.

6. The system of claim 5, wherein one or more of the plurality of hierarchical clients are directly coupled to the packet memory arbiter separately from the client chain via one or more secondary interfaces, and further wherein the secondary interfaces are only used to transmit the packet data to be read out from the packet memory to the plurality of system ports.

7. The system of claim 6, wherein the client chain further comprises one or more additional write clients that are unaffiliated with the plurality of system ports and configured to write the packet data into the packet memory.

8. The system of claim 7, further comprising a plurality of additional system ports that are each associated with one of a plurality of additional hierarchical clients, wherein each of the plurality of additional hierarchical clients and the packet memory arbiter are serially communicatively coupled together via a plurality of additional interfaces thereby forming an additional client chain, and further wherein all of the plurality of additional hierarchical clients write the packet data to or read the packet data from the packet memory via the additional client chain.

9. The system of claim 8, wherein each cycle the packet memory arbiter is configured to limit a sum of a number of the plurality of system ports and a number of the plurality of additional system ports that are granted access to write the packet data into the one or more memory banks of the packet memory such that the sum is equal to or less than the number of write ports of the one or more memory banks.

10. The system of claim 9, wherein the additional client chain and the client chain have substantially the same latency.

11. The system of claim 10, wherein the primary interfaces and the secondary interfaces are wide interfaces having a large bandwidth.

12. The system of claim 1, wherein after granting one of the requests, the packet memory arbiter transmits a return tag to the port that sent the request via the associated hierarchical client, wherein the return tag identifies the associated hierarchical client and the port that sent the request, and further wherein the return tag indicates to the port that sent the request when to write packet data to or read packet data from the client chain in order to fulfill the requested access to the packet memory.

13. A packet memory arbiter stored on a non-transitory computer-readable memory, wherein the packet memory arbiter is configured to:
receive a plurality of requests sent by one or more of a plurality of system ports to access read ports or write ports of memory banks of a packet memory, wherein each of the plurality of system ports are associated with one of a plurality of hierarchical clients, and further wherein each of the requests include a request tag that identifies the one of the plurality of system ports that initiated the request and hierarchical client to which the one of the plurality of system ports belongs; and
arbitrate between the plurality of requests by granting one of the requests.

14. The packet memory arbiter of claim 13, wherein each of the plurality of hierarchical clients and the packet memory arbiter are serially communicatively coupled together via a plurality of primary interfaces thereby forming a client chain.

15. The packet memory arbiter of claim 14, wherein the packet memory arbiter is further configured to at least one of: receive via the client chain packet data that is to be written into the packet memory from the plurality of hierarchical clients, and output via the client chain packet data that is to be read out from the packet memory to the plurality of hierarchical clients.

16. The packet memory arbiter of claim 15, wherein the plurality of hierarchical clients arbitrate between requests to access the packet memory from the plurality of system ports.

17. The packet memory arbiter of claim 16, wherein the client chain is only used to transmit the packet data to be read out from the packet memory to the plurality of system ports and the packet memory arbiter is at the beginning of the client chain.

18. The packet memory arbiter of claim 16, wherein the client chain is used both to transmit the packet data to be read out from the packet memory to the plurality of system ports and to transmit the packet data to be written into the packet memory from the plurality of system ports, and further wherein the client chain forms a loop such that the packet memory arbiter is at the beginning and end of the client chain.

19. The packet memory arbiter of claim 16, wherein the client chain is only used to transmit the packet data to be written into the packet memory from the plurality of system ports and the packet memory arbiter is at the end of the client chain.

20. The packet memory arbiter of claim 19, wherein one or more of the plurality of hierarchical clients are directly coupled to the packet memory arbiter separately from the client chain via one or more secondary interfaces, and further wherein the secondary interfaces are only used to transmit the packet data to be read out from the packet memory to the plurality of system ports.

21. The packet memory arbiter of claim 20, wherein the client chain further comprises one or more additional write clients that are unaffiliated with the plurality of system ports and configured to write the packet data into the packet memory.

22. The packet memory arbiter of claim 21, wherein a plurality of additional system ports are each associated with one of a plurality of additional hierarchical clients, and further wherein each of the plurality of additional hierarchical clients and the packet memory arbiter are serially communicatively coupled together via a plurality of additional interfaces thereby forming an additional client chain, and further wherein all of the plurality of additional hierarchical clients write the packet data to or read the packet data from the packet memory via the additional client chain.

23. The packet memory arbiter of claim 22, wherein each cycle the packet memory arbiter is configured to limit a sum of a number of the plurality of system ports and a number of the plurality of additional system ports that are granted access to write the packet data into the one or more memory banks of the packet memory such that the sum is equal to or less than the number of write ports of the memory banks.

24. The packet memory arbiter of claim 23, wherein the additional client chain and the client chain have substantially the same latency.

25. The packet memory arbiter of claim 24, wherein the primary interfaces and the secondary interfaces are wide interfaces having a large bandwidth.

26. The packet memory arbiter of claim 25, wherein the plurality of hierarchical clients are configured to transmit the requests to access the packet memory from the plurality of system ports to the packet memory arbiter.

27. A method of utilizing a packet processing system, the method comprising:
transmitting a plurality of requests for access of memory banks of a packet memory to a packet memory arbiter from one or more of a plurality of system ports that are each associated with one of a plurality of hierarchical clients, wherein each of the requests include a request tag that identifies the one of the plurality of system ports that initiated the request and the hierarchical client with which the one of the plurality of system ports is associated;
arbitrating between the plurality of requests with the packet memory arbiter by granting one of the requests; and
transmitting packet data associated with the granted request from the memory banks of the packet memory to the port that sent the granted request.

28. The method of claim 27, further comprising after granting the one of the requests, transmitting with the packet memory arbiter a return tag to the port that sent the request via the associated hierarchical client, wherein the return tag identifies the associated hierarchical client and the port that sent the request, and further wherein the return tag indicates to the port that sent the request when to write packet data to or read packet data from a client chain such that the requested access to the packet memory by the request is able to be fulfilled.

29. The method of claim 28, wherein the plurality of hierarchical clients arbitrate between requests to access the packet memory from the plurality of system ports.

30. The method of claim 29, wherein the client chain is only used to transmit the packet data to be read out from the packet memory to the plurality of system ports and the packet memory arbiter is at the beginning of the client chain.

31. The method of claim 29, wherein the client chain is used both to transmit the packet data to be read out from the packet memory to the plurality of system ports and to transmit the packet data to be written into the packet memory from the plurality of system ports, and further wherein the client chain forms a loop such that the packet memory arbiter is at the beginning and the end of the client chain.

32. The method of claim 29, wherein the client chain is only used to transmit the packet data to be written into the packet memory from the plurality of system ports and the packet memory arbiter is at the end of the client chain.

33. The method of claim 32, wherein one or more of the plurality of hierarchical clients are directly coupled to the packet memory arbiter separately from the client chain via one or more secondary interfaces, and further wherein the secondary interfaces are only used to transmit the packet data to be read out from the packet memory to the plurality of system ports.

34. The method of claim 33, wherein the client chain further comprises one or more additional write clients that are unaffiliated with the plurality of system ports and configured to write the packet data into the packet memory.

35. The method of claim 34, wherein a plurality of additional system ports are each associated with one of a plurality of additional hierarchical clients, and further wherein each of the plurality of additional hierarchical clients and the packet memory arbiter are serially communicatively coupled together via a plurality of additional interfaces thereby forming an additional client chain, and further wherein all of the plurality of additional hierarchical clients write the packet data to or read the packet data from the packet memory via the additional client chain.

36. The method of claim 35, further comprising each cycle limiting with the packet memory arbiter a sum of a number of the plurality of system ports and a number of the plurality of additional system ports that are granted access to write the packet data into the one or more memory banks of the packet memory such that the sum is equal to or less than the number of write ports of the memory banks.

37. The method of claim 36, wherein the additional client chain and the client chain have substantially the same latency.

38. The method of claim 37, wherein the primary interfaces and the secondary interfaces are wide interfaces having a large bandwidth.

* * * * *